US012259906B2

(12) United States Patent
Holroyd et al.

(10) Patent No.: US 12,259,906 B2
(45) Date of Patent: Mar. 25, 2025

(54) RESTRICTION-COMPLIANT DATA REPLICATION

(71) Applicant: LENOVO GLOBAL TECHNOLOGY (UNITED STATES) INC., Morrisville, NC (US)

(72) Inventors: William L Holroyd, Holly Springs, NC (US); Rodrigo Felix De Almeida, Raleigh, NC (US); Prabhat Alok Tyagi, Cary, NC (US); Alfredo Zugasti, Cary, NC (US)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 23 days.

(21) Appl. No.: 17/709,813

(22) Filed: Mar. 31, 2022

(65) Prior Publication Data
US 2023/0315750 A1  Oct. 5, 2023

(51) Int. Cl.
*G06F 16/27* (2019.01)
*G06F 16/2455* (2019.01)
*G06F 21/60* (2013.01)
*G06F 21/62* (2013.01)

(52) U.S. Cl.
CPC ........ *G06F 16/27* (2019.01); *G06F 16/24565* (2019.01); *G06F 21/602* (2013.01); *G06F 21/6227* (2013.01)

(58) Field of Classification Search
CPC .. G06F 16/27; G06F 16/24565; G06F 21/602; G06F 21/6227; G06F 16/273; G06F 16/275; G06F 16/278

USPC ......................................................... 707/610
See application file for complete search history.

(56) References Cited

U.S. PATENT DOCUMENTS

| | | | | |
|---|---|---|---|---|
| 9,619,539 B2* | 4/2017 | Sayed | ..................... | G06F 3/065 |
| 11,675,503 B1* | 6/2023 | Ekins | ..................... | G06F 3/0637 711/163 |
| 2014/0282392 A1* | 9/2014 | Shukla | ................ | G06F 9/45529 717/116 |
| 2021/0097041 A1* | 4/2021 | Patel | .................. | G06Q 30/0205 |
| 2022/0284042 A1* | 9/2022 | Fouda | ................... | G06F 16/275 |

OTHER PUBLICATIONS

C. J. Doherty and N. J. Hurley, "Hierarchical Policy-Based Replication," 2007 IEEE International Performance, Computing, and Communications Conference, New Orleans, LA, USA, 2007, pp. 254-263, doi: 10.1109/PCCC.2007.358902. (Year: 2007).*

(Continued)

*Primary Examiner* — Michael Pham (57) ABSTRACT

Restriction-compliant data replication including receiving a request to replicate a dataset of a database that is stored in a cloud-based data warehouse at a first region of a plurality of geographic regions to a second region of the plurality of geographic regions, wherein the second region is subject to persistent storage restrictions different from restrictions of the first region; selecting a replication policy, applicable to the second region, wherein the replication policy specifies replication restrictions that conform to the persistent storage restrictions of the second region; and replicating the dataset from the first region to the second region, including applying the replication policy to the dataset.

19 Claims, 4 Drawing Sheets

(56) References Cited

OTHER PUBLICATIONS

Oxford English Dictionary, s.v. "encrypt (v.)," Jul. 2023, https://doi.org/10.1093/OED/8827218951. (Year: 2023).*

Loiselle, What does GDPR compliance mean for my database, Cockroach Labs, URL: https://www.cockroachlabs.com/blog/gdpr-compliance-for-my-database/, dated Jul. 10, 2018, 8 pages.

MongoDB, Segmenting Data by Location, URL: https://docs.mongodb.com/manual/tutorial/sharding-segmenting-data-by-location/#procedure, 2021, printed Feb. 25, 2022, 9 pages.

Olaf Van Wijk, Geo sharding a DAG, Coinmonks, URL: https://medium.com/coinmonks/geo-sharding-a-dag-52c008eabddb, dated Dec. 19, 2019, 9 pages.

* cited by examiner

RESTRICTION-COMPLIANT DATA REPLICATION

BACKGROUND

Field of the Invention

The field of the disclosure is data processing, or, more specifically, methods, apparatus, and products for restriction-compliant data replication.

Description of Related Art

Data replication models generally define data replication as a process where the entirety of a database gets replicated to a target device or region. This increases data under ownership of various entities. Moreover, certain government regulations or other rule systems may prohibit the replication of all or part of a dataset from or to a device or region.

SUMMARY

Methods, apparatus, and products for restriction-compliant data replication according to various embodiments are disclosed in this specification. Such restriction-compliant data replication may include: receiving a request to replicate a dataset of a database that is stored in a cloud-based data warehouse at a first region of a plurality of geographic regions to a second region of the plurality of geographic regions, wherein the second region is subject to persistent storage restrictions different from restrictions of the first region; selecting a replication policy, applicable to the second region, wherein the replication policy specifies replication restrictions that conform to the persistent storage restrictions of the second region; and replicating the dataset from the first region to the second region, including applying the replication policy to the dataset.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
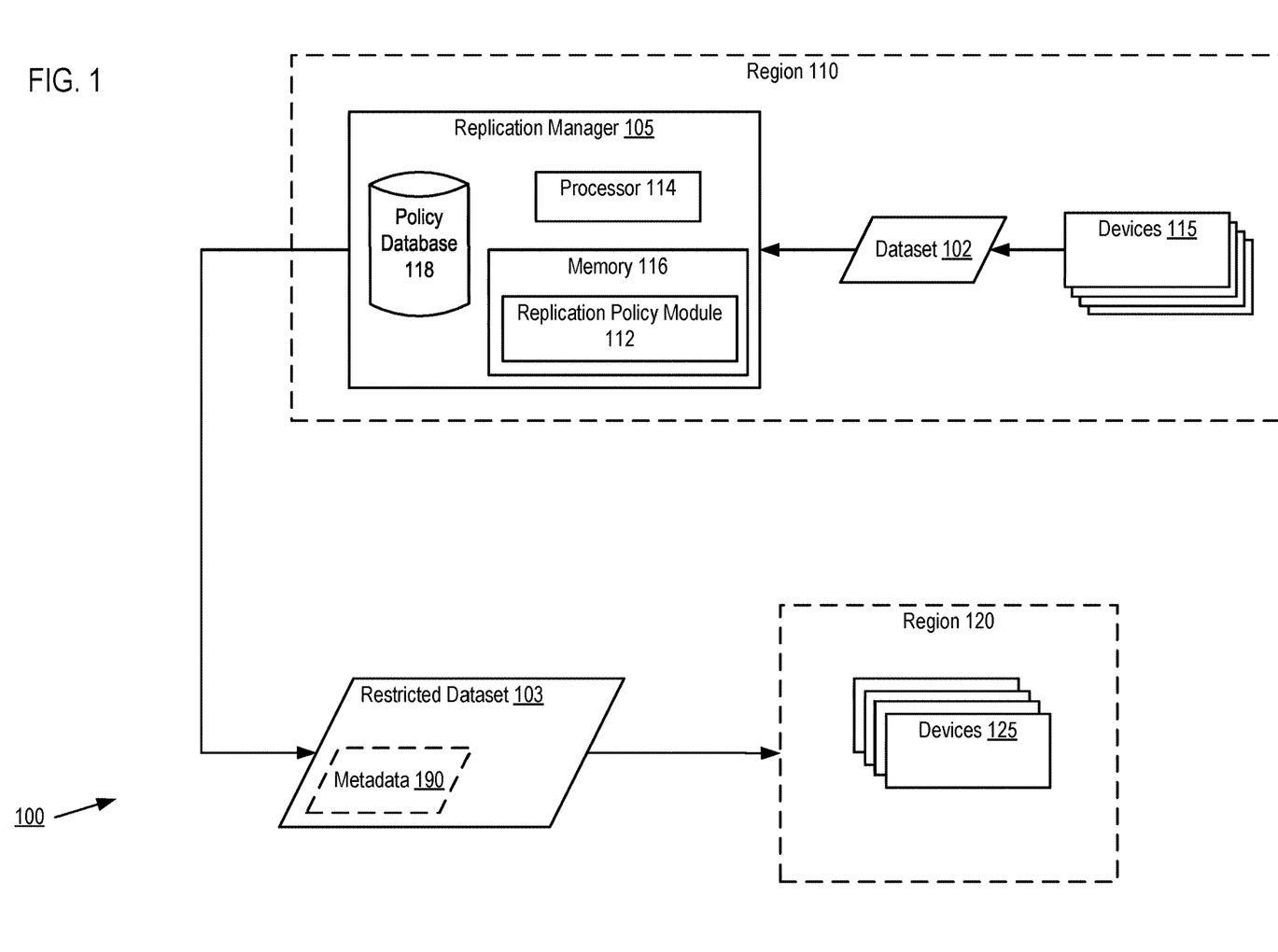
FIG. 1 shows a block diagram of an example system configured for restriction-compliant data replication in accordance with embodiments of the present disclosure.

Exemplary methods, apparatus, and products for restriction-compliant data replication in accordance with the present disclosure are described with reference to the accompanying drawings, beginning with FIG. 1. FIG. 1 sets forth an example block diagram of a system 100 configured for restriction-compliant data replication according to embodiments of the present disclosure. The example system 100 depicted in FIG. 1 includes a number of computing devices in at two different regions 110 and 120. Regions and 110 and 120 may be different geographic regions. For example, region 110 may correspond to North America, whereas region 120 may correspond to Europe. Similarly, the regions may correspond to individual countries or sub-divisions of countries such as individual states or provinces. Additionally or alternatively, the regions may correspond to sets of computing devices or computing instances that are grouped into logical divisions independent of the physical locations of the computer hardware that is used to execute those computing instances. For example, a set of computing instances (e.g., virtual computing instances) may be executed using computer components that are physically located in one location, but they may be logically divided into two or more subsets such that region 110 and region 120 correspond to different logical subsets of the computing instances.

In some implementations, a user may use a computing device associated with region 110 to access data that is stored on a computing device that is associated with a different region such as region 120. The user may not intentionally be targeting data in a different region, however the user's request for that data may be routed to a different region based on the characteristics of the network topology and routing protocols that are applicable to the user's computing device and other computing devices in region 110. Moreover, the requested data may be part of a database that is stored in a cloud-based data warehouse. Once the request reaches a routing or networking device of the cloud-based data warehouse, it may redirected in ways that are unexpected or undetermined by the requesting user. In some implementations, the cloud-based data warehouse is a computing system or group of computing systems that hosts a database or databases for access over a network, such as a wide area network. The cloud-based data warehouse may be created entirely in a cloud computing environment such as, for example, Amazon Web Services ('AWS'), Microsoft Azure, Google Cloud Platform, IBM Cloud, Oracle Cloud, and others. In other implementations, the request may reach a device that is hosted in an on-premise location a company or client owns or in some other co-located server environment.

In some implementations, regions 110 and 120 include devices 115 and 125. Devices 115 and 125 may include any type of computer device including, but not limited to, software devices or hardware devices, application servers, storage servers, compute devices, networking devices, or the like. Devices 115 may include, for example, end-user or client devices that execute a computer application. For example, the abovementioned data may be requested as part of an application function executed via one of devices 115. The application functions may include, for example, a database query.

In some implementations, as noted above, devices 115 and 125 may include storage devices that store data in databases. Data may be stored or updated in a database as a result of, for example, a data write operation caused while a user executing a software application that interacts with the database. Data may also be stored or updated as part of a data replication process. In one embodiment, one or more of devices 115 associated with region 110 may replicate data to one or more of devices 125 associated with region 120. Replication may be performed to maintain copies of data in the event that a storage device becomes unavailable. For example, all or part of a database may be replicated from one device to another during a scheduled replication process. In other embodiments, changes may be replicated to devices 125 in region 120 any time there is a database update to any of devices 115 in region 110.

Readers will appreciate that national or international laws, regulations, treaties, or other agreements may include data protection, data retention, or data privacy rules that impose restrictions or other legal obligations on the abovementioned database update or replication processes. These regulations may impact, in certain regions, the storage or replication of data or other operations executed with respect to a dataset. For example, the General Data Protection Regulation (GDPR) of European Union (EU) law requires that personal information of an EU citizen should either be stored on computing devices inside the EU, or within a jurisdiction that has similar levels of data protection. Accordingly, where replication of EU data is to be performed to devices outside the EU to maintain copies of the data as described above, the GDPR may restrict replication of EU citizens' personal information to computing devices outside the EU. More specifically, regulations such as GDPR and others may prohibit storage of the data in a persistent or non-volatile storage. Readers will appreciate that, under applicable regulations, other forms of temporary access to the data may be permitted under specific circumstances. For example, the regulation may permit that the data cannot be persistently stored in a certain region but can be accessed by computing devices from that region and placed in temporary storage (e.g., volatile memory storage, cache memory, or the like).

While a potential solution to address the impact of these regulations includes building out and maintaining a full copy of a database in each region, readers will appreciate that such a solution may be time- and resource-intensive and unnecessarily duplicate data in multiple regions. Moreover, a globally distributed service relying on this data will need to ensure that users in a certain region that use the service are only redirected to the database within that region. This may not be feasible because existing routing protocols may redirect the user across various networks in a region-independent manner and so the path of a user request will need to modified to only reach the database in the user's region. Such network modifications will also require additional configuration of database servers, networks, and user applications.

The example system 100 depicted in FIG. 1 includes replication manager 105. Replication manager 105 may be a software component, hardware component, or some combination thereof. Replication manager 105 may be, for example, another computing device like devices 115 (or devices 125). While replication manager 105 is depicted as a separate component within region 110, replication manager 105 may not be a component that is separate from devices 115 and may be a component of one or more of devices 115. Moreover, while replication manager 105 is depicted as being part of region 110, replication manager 105 may be included within region 120, or within region 110 and region 120, or in some other region that is distinct from regions 110 and 120. An instance of replication manager 105 that is associated with region 110 may be configured to perform the disclosed methods with respect to datasets that are replicated to other regions such as datasets replicated to or stored at region 120.

In some implementations, replication manager 105 may include memory 116, which may be implemented as a random access memory (RAM), a read-only memory (ROM), an erasable programmable read-only memory (EPROM or Flash memory) or the like. Stored in memory 116 is a replication policy module 112. Replication policy module 112 may be a module of computer program instructions that correspond to the methods described below with respect to FIGS. 2-4. Replication manager 105 can also include at least one computer processor 114 or 'CPU' which may be connected through a memory bus (not shown) to memory 116 and to other components of replication manager 105.

In some implementations, replication manager 105 may include policy database 118. As described above, data protection or data privacy rules may impose restrictions or other legal obligations on operations that can be performed on a dataset. Replication manager 105 may be configured to store electronic representations of these restrictions in policy database 118. In one embodiment, the restrictions may be defined in a replication policy. As used herein, the term 'replication policy' refers to a set of rules or restrictions that apply to a particular dataset when it is replicated to or from a region that is associated with the dataset. For example, a particular replication policy may include restrictions on persistent storage of a dataset. A replication policy may prohibit the persistent storage of a dataset containing, for example, the personal information of EU citizens, in any computing devices that are outside the EU region. As another example, a replication policy may specify that persistent storage of data from a source region (e.g., the EU) is prohibited when that data is replicated to a destination region (e.g., the US) but that the data can be placed in temporary storage (e.g., cache memory) at the destination region.

As depicted in FIG. 1, a dataset 102 may be transmitted from region 110. For example, dataset 102 may need to be replicated to devices 125 in region 120. In some implementations, replication manager 105 can implement restrictions on dataset 102 pursuant to a replication policy. For example, replication manager 105 may determine (e.g., via replication policy module 112) that dataset 102 is to be replicated from devices 115 in region 110 to devices 125 in region 120. Replication manager 105 can determine that a replication policy is applicable to data replicated from region 110 and/or that a replication policy is applicable to data replicated from region 110 to region 120. Accordingly, replication manager 105 may select a replication policy from policy database 118 and apply it to dataset 102. The policy restrictions may be applied before or after the data is replicated to region 120.

In some implementations, replication manager 105 can provide an ability to define a replication policy. In some implementations, replication manager 105 may be configured to provide an interface or environment that enables a user or application to define how rules can be applied to a dataset in order to implement the abovementioned regulations or laws. Replication manager 105 may be configured to provide different policy definition or scripting environments based on characteristics of the database to which the restrictions are to be applied. Such an environment may provide the ability to define how a replication policy may affect the use of a dataset through the use of any domain-specific language that is applicable to the dataset.

Such a domain-specific language may provide the ability to define restrictions on dataset, index, and whole data replication or, more generally, translate geographically based replication policies due to law into a replication policy that can take effect on the dataset, all without having to rely on pre-programmed rules or methods that existed at the time the database software was written. Replication manager 105 may include the abovementioned policy definition or scripting capability as an enhancement or optional add-on to a database viewing or editing interface. For example, where the database is a Structured Query Language (SQL) database, replication manager 105 may provide an environment for a user to define a replication policy that can be applied to the SQL database. Replication manager 105 can determine the database that is being viewed and pre-populate the policy scripting environment with suggested variables, commands, or other values that are relevant to the database, thereby facilitating definition of the replication policy for that database.

In a related embodiment, replication manager 105 may present an interface where a user can select restrictions in a language- or domain-independent manner and convert the user's selections into a replication policy in the appropriate domain-specific language that is applicable to the dataset. For example, replication manager 105 may be configured to present an interface where a user can enter pseudocode or plain-language commands or select graphical elements (e.g., checkboxes) that correspond to restrictions such as "prevent persistent storage", "encrypt", "prevent editing", and the like. The interface may also present sections of the dataset (e.g., columns) and regions (e.g., a list of countries) in a selectable manner such that the user can select a column on which the selected restrictions should apply. Based on the user's selections, replication manager 105 can generate domain-specific commands that can be compiled into a replication policy that is then applicable to dataset 102.

In some implementations, application of the replication policy results in dataset 102 being converted to restricted dataset 103, as depicted in FIG. 1. Restricted dataset 103 may have some or all of the data contained in dataset 102, but with restrictions on certain data and/or on certain operations that can be performed with respect to the data. For example, certain data may be prevented from being stored in persistent storage. As another example, replication manager 105 may cause some or all of dataset 102 to be encrypted before it is transmitted as restricted dataset 103 to devices 125 in region 120.

In some implementations, application of a replication policy may result in metadata 190 being added into restricted dataset 103. As noted above, restricted dataset 103 may prevent certain operations at region 120 from being performed on the dataset, such as persistent storage. However, metadata 190 may include data that identifies potential alternate actions that can be taken to carry out restricted dataset operations while remaining in compliance with the replication policy. As an example, data from dataset 102 may be made inaccessible to users in region 120 (e.g., by encryption, anonymization, or the like), but metadata 190 may include details of how and where a user associated with region 120 can access the inaccessible data. These details may be in the form of a pointer or reference within restricted dataset 103 but to another dataset or other database that can provide data that is restricted in restricted dataset 103. As another example, metadata 190 may include authorization requirements for a region 120 user that, if satisfied, may enable the region 120 user to access the inaccessible data. Similarly, metadata 190 may define security requirements for a device in region 120 that, if satisfied by a device, allow dataset operations that are otherwise restricted.

In other implementations, metadata 190 may indicate identifiers for authorized users or computing devices that may be used to perform operations on the data in an unrestricted or less restricted manner. Where the data is encrypted because of applied restrictions, metadata 190 may include information that can be used by a user of one of devices 125 to, for example, view the data in an unencrypted manner. Metadata 190 may include details of required authentication or authorization information that, if provided, can be used to perform unrestricted or less restricted operations on the dataset. Metadata 190 may include a description of the applicable replication policy.

Figure 2:
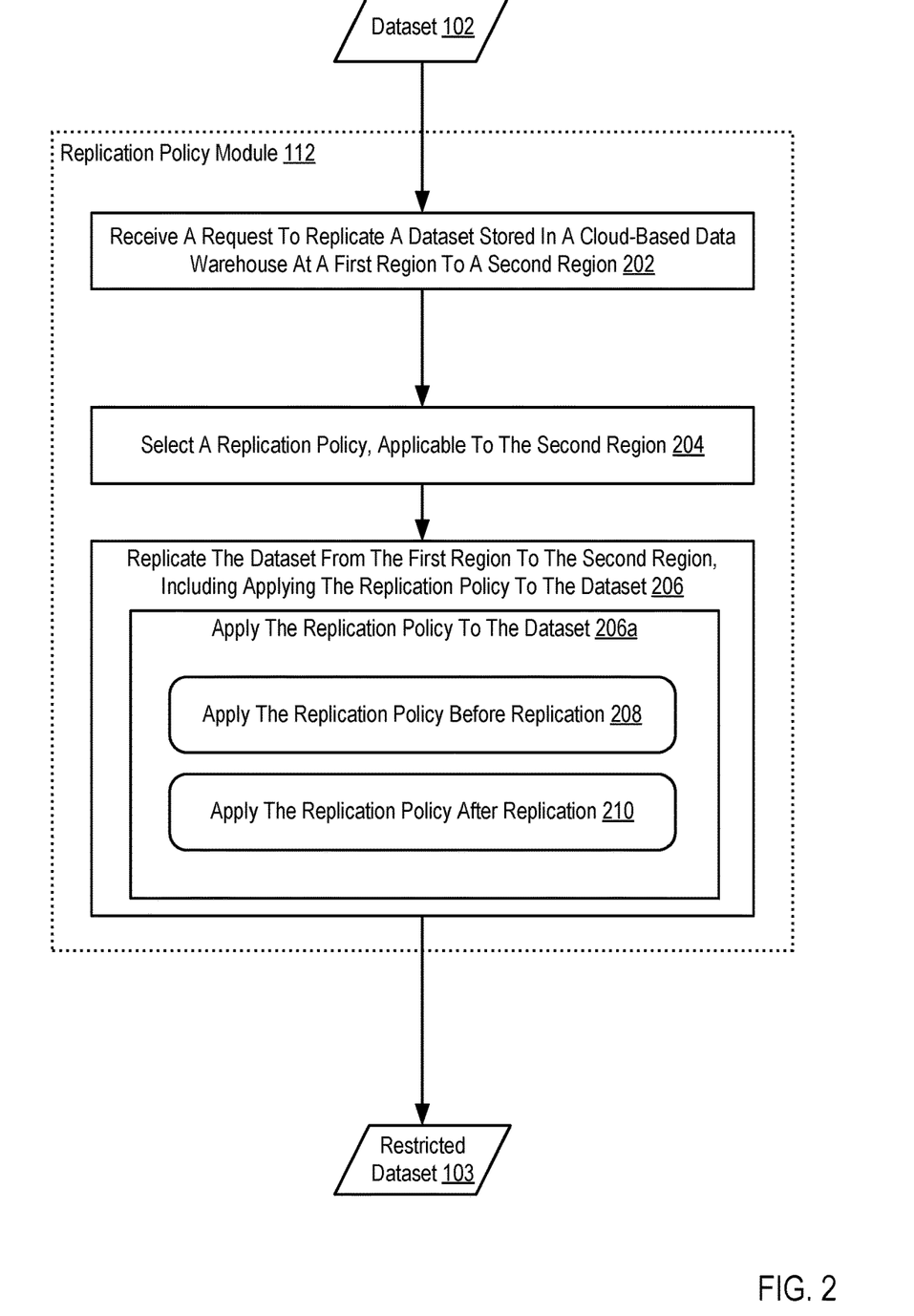
FIG. 2 is a flowchart of an example method for restriction-compliant data replication according to some embodiments of the present disclosure.

For further explanation, FIG. 2 sets forth a flowchart illustrating an example method of restriction-compliant data replication according to embodiments of the present disclosure. The method of FIG. 2 may be implemented by, for example, one or more components of replication manager 105 (e.g., replication policy module 112). The method of FIG. 2 includes receiving 202 a request to replicate a dataset stored in a cloud-based data warehouse at a first region to a second region. Receiving the request to replicate a dataset can include receiving the request from a storage device or storage controller that is configured to replicate the dataset to maintain copies of the dataset in different locations. The received request may include the dataset (e.g., dataset 102) and identifiers of the region and/or devices to which the dataset is to be replicated.

The method of FIG. 2 also includes selecting 204 a replication policy, applicable to the second region. Selecting a replication policy can include determining, based on the request, that a replication policy is applicable to dataset replication from region 110 (or from region 110 to region 120). For example, replication manager 105 can determine that a replication policy is associated with region 110. In other words, replication from region 110 to any other region may result in implementation of a replication policy associated with region 110 to the replicated data. In some implementations, there may be a table or other data structure in policy database 118 that maintains associations or mappings between a region and one or more replication policies. In other implementations, replication manager 105 can determine characteristics of the dataset to be replicated and, based on the determination, present a replication policy editor or scripting environment where a replication policy can be defined. Once replication manager 105 determines that definition of the replication policy is completed, replication manager 105 may select the defined replication policy for application to the dataset.

The method of FIG. 2 also includes replicating 206 the dataset from the first region to the second region, including applying the replication policy to the dataset. For example, the replication policy may define that if any data is replicated from region 110 to any other region, persistent storage (e.g., into a persistent storage such as a hard disk storage device or a solid state storage device) of the data should be prevented. Accordingly, replication manager 105 updates the dataset to include the abovementioned restrictions. For example, replication manager 105 may replicate the dataset to region 120 as restricted dataset 103 but with constraints on saving the data. These constraints may take the form of dataset configuration parameters or restrictions applied to database application software at region 120 when restricted dataset 103 is being viewed that prevent persistent storage of restricted dataset 103. In other implementations, application of the replication policy may cause encryption or obfuscation of all or part of restricted dataset 103.

In some implementations, replicating 206 the dataset from the first region to the second region includes applying 208 the replication policy before replication of the dataset. In other words, dataset 102 may be converted into restricted dataset 103 prior to the data being transmitted to a device in region 103. This may mean that, for example, all or part of the dataset is presented in an encrypted manner or in a read-only manner that prevents editing or saving the restricted portions of the dataset.

In some implementations, replicating 206 the dataset from the first region to the second region includes applying 210 the replication policy after replication. In certain circumstances, it may not be feasible to apply restrictions to a dataset before it is replicated. In one scenario, the source region—such as region 110—may have previously stored dataset 102 in an unrestricted manner but the data in dataset 102 may be associated with the destination region, such as region 120. For example, the source region may be the US, but US servers may have stored data of EU users in an unrestricted manner with no instance of that data in the EU at a particular time. At that time, a law may take effect that imposes restrictions on the storage of EU data outside the EU. The effect of the law may be that the EU data stored in the US must now be replicated to EU servers that will store the data in the EU for the first time. Another effect of the law will be to impose restrictions on the data on US servers. For example, the law may now require that the dataset must be encrypted outside the EU. In such a scenario, a replication policy imposing restrictions on the dataset should not be applied to the dataset before it is replicated to the EU, otherwise the applied restrictions will first encrypt the data in the US and then transmit it encrypted to the EU with potentially no way for EU users to decrypt that data.

Instead, replication manager 105 determines, based on the replication policy, that the data should be replicated first to the destination region with the replication policy's restrictions being applied subsequent to replication. Based on user definition of the replication policy and/or based on characteristics of the source or destination region, replication manager 105 may be configured to determine whether the replication policy is to be applied prior to or after replicating the dataset to the destination region.

Figure 3:
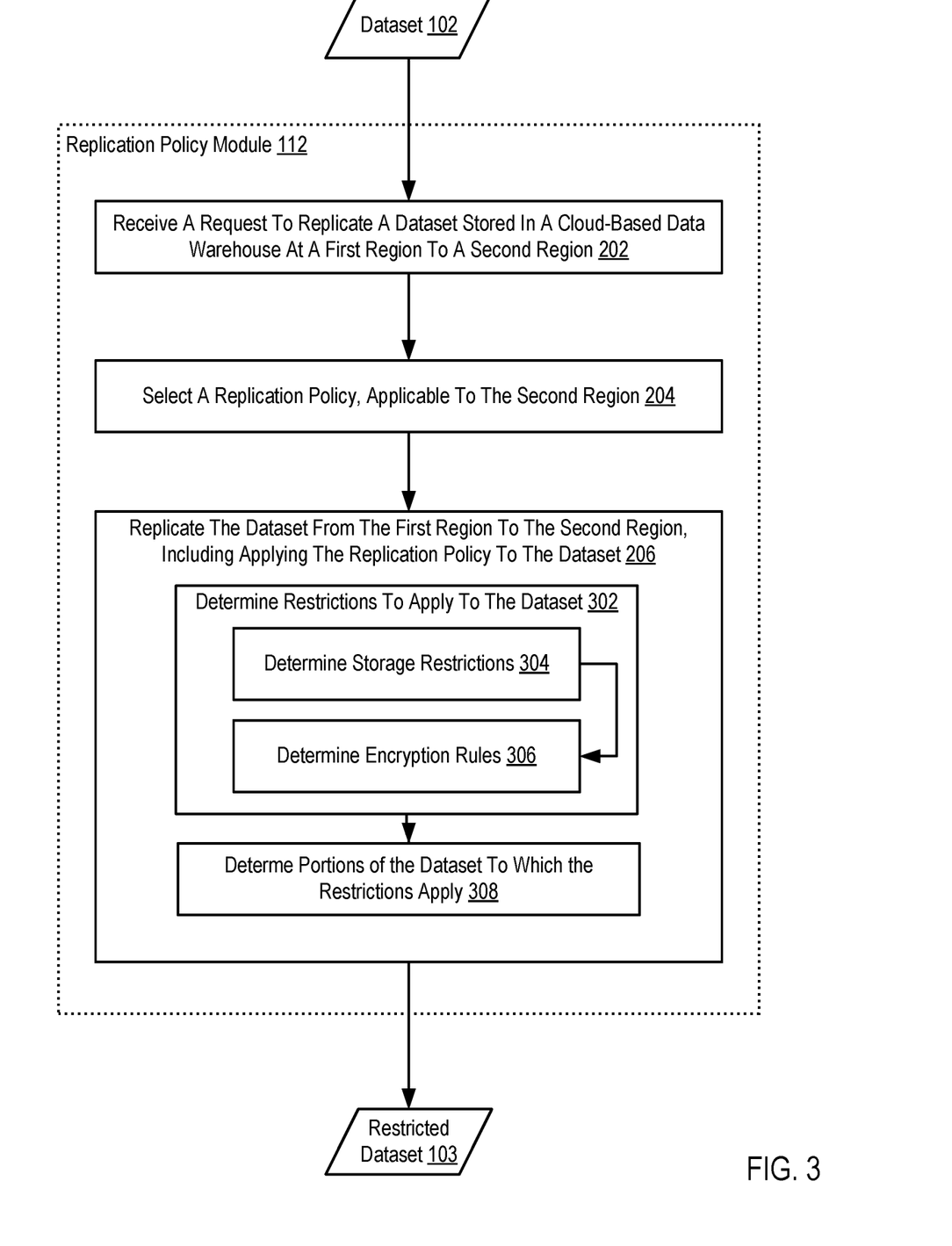
FIG. 3 is a flowchart of an example method for restriction-compliant data replication according to some embodiments of the present disclosure.

For further explanation, FIG. 3 sets forth a flowchart illustrating an example method of restriction-compliant data replication according to embodiments of the present disclosure. The method of FIG. 2 may be implemented by, for example, one or more components of replication manager 105 (e.g., replication policy module 112). The method of FIG. 3 continues with the method of FIG. 2 by further including, as part of replicating 206 the dataset, determining 302 restrictions to apply to the dataset.

Determining 302 restrictions to apply to the dataset may include determining 304 storage restrictions to apply to the dataset. For example, a replication policy may specify that computing devices in the destination region for the replicated dataset should be prevented from storing all or part of the dataset in persistent storage. The replication policy may specify that the replicated dataset can be stored only using certain computing devices that satisfy security or other requirements. For example, the replication policy may specify that dataset 102 is to be replicated only to storage devices that are secured using particular technologies (e.g., use of antivirus software, using secure data transfer protocols, applying software patches according to a defined schedule, etc.). The replication policy may specify that the dataset 102 must be stored in encrypted form once received by computing devices at the destination region.

As another example, the replication policy may dictate that updates (e.g., writes) to a dataset are to be replicated globally to other regions except to one particular region. Accordingly, the changes to the dataset may be replicated globally to each region, except to one region. Similarly, the replication policy may specify that all portions of the dataset may be replicated to a destination region, except one portion of the dataset. As a result, replication manager 105 may determine the portion of the dataset that is not to be replicated to the destination region and prevent replication of that portion of the dataset to that destination region. Replication manager 105 may be further configured to replace the non-replicated portion of the dataset with another value (e.g., a null value or a pointer to another storage location) when replicating the dataset to the destination region.

Determining 302 restrictions to apply to the dataset may include determining encryption rules pertaining to data in the dataset during its replication. For example, the dataset may be a table of personal information of a number of EU citizens. One or more columns may include personally identifiable information of the citizens, such as a national identification number. The replication policy may specify that the column for the national identification number should be encrypted, though the remaining data can remain unencrypted.

The method of FIG. 3 also includes determining 308 portions of the dataset to which the restrictions apply. As noted above, certain replication restrictions may be applicable only to portions of a dataset. A replication policy may include different sets of replication restrictions that are applicable to different portions of the same dataset. One set of replication restrictions may be applicable to one portion of the dataset, while another set of replication restrictions may be applicable to another portion of the same dataset. Accordingly, replication manager 105 determines portions of the dataset to which a certain set of replication restrictions are applicable, as part of applying the replication policy to the dataset.

Figure 4:
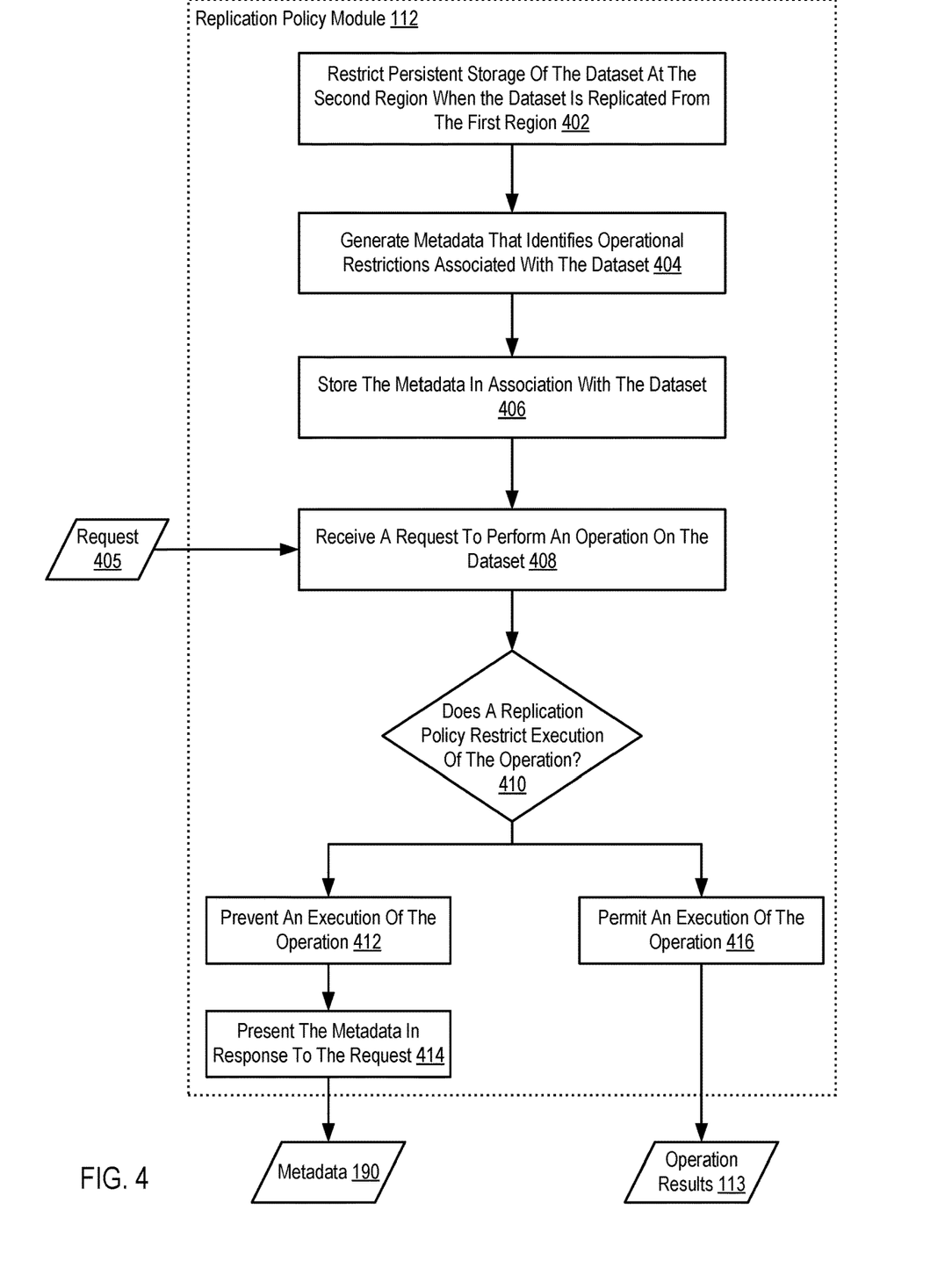
FIG. 4 is a flowchart of an example method for restriction-compliant data replication according to some embodiments of the present disclosure.

For further explanation, FIG. 4 sets forth a flowchart illustrating an example method of restriction-compliant data replication according to embodiments of the present disclosure. The method of FIG. 2 may be implemented by, for example, one or more components of replication manager 105 (e.g., replication policy module 112). The method of FIG. 4 includes restricting 402 persistent storage of the dataset at the second region when the dataset is replicated from the first region. As noted above, replication manager 105 may prevent all or part of a dataset that is being replicated from being persistently stored at a destination region. However, the applicable replication policy may specify that certain users or computer applications or components associated with the destination region may still access the data without one or more applied restrictions. To be able to do this, the destination users or applications may require details on what restrictions have been applied and how the data can be accessed without restrictions.

Accordingly, the method of FIG. 4 also includes generating 404 metadata that identifies operational restrictions associated with the dataset. The metadata (e.g., metadata 190) specifies the restrictions applied to portions of the dataset. For example, the metadata may indicate that a column of the dataset is encrypted using a certain encryption method. The metadata may indicate another user or another computer that has access to encryption keys that may be used to decrypt the encrypted data. Moreover, the metadata may indicate other storage locations where the data is available without restrictions. For example, the dataset may be replicated from a storage device in the EU to another storage device in the US. A user accessing the replicated dataset that is stored in the US may observe that one or more portions of the data are restricted due to the applicable replication policy. However, the metadata associated with the dataset may indicate, for example, the EU servers from where the data can be accessed in unrestricted form.

As noted above, while replication manager 105 is depicted in FIG. 1 as being part of region 110, replication manager 105 or similar components may, alternatively or additionally, be associated with region 120 or with a region outside regions 110 and 120. Readers will appreciate that an instance of replication manager 105 associated with region 110 may be configured to perform the methods of FIGS. 2-4 on data that has been replicated to region 120, and vice versa. For example, an instance of replication manager 105 associated with region 110 may be configured to cause the storage of metadata in associated with the dataset at region 120.

Accordingly, the method of FIG. 4 also includes storing 406 (e.g., by replication manager 105) the metadata in association with the dataset. The metadata may be additional data that is in the same format as data of the dataset. For example, the metadata may be additional columns or rows in a table. The metadata may be an additional file that is provided with the dataset. The metadata may be representative of the dataset, particularly of portions that are restricted. For example, in the case where a column of the dataset is encrypted, the metadata may take the form of cryptographic hashes or other encrypted values that represent the data.

The method of FIG. 4 also includes receiving 408 a request 405 to perform an operation on the dataset. Again, the request may be received by an instance of replication manager 105 at region 120. For example, a US user may wish to copy data into persistent storage from a dataset that includes data that was replicated from EU servers and includes personal information of EU citizens. The method also includes determining 410 whether a replication policy restricts execution of the requested operation. In some implementations, an instance of replication manager 105 at region 120 may be configured to determine whether a replication policy is applied to the relevant dataset. This may include analyzing the metadata of the dataset to determine whether and what restrictions have been applied to the dataset.

In one embodiment, replication manager 105 may determine that a restriction does apply to operations performed with respect to the dataset. For example, the restrictions may include that the dataset cannot be stored in persistent storage in that particular region. If so, the method of FIG. 4 also includes preventing 412 an execution of the operation if the operations requires persistent storage. As in the above example, where the US user wishes to copy data into persistent storage, the requested operation will be prevented from being executed. If so, the method of FIG. 4 may also include presenting 414 the metadata in response to the request. In lieu of permitting the operation to be performed, replication manager 105 can present metadata that describes the applied restrictions, provides background or references regarding the restrictions (e.g., links to GDPR rules), and/or provides the user with resources on how to access the data in an unrestricted manner (e.g., by providing elevated permissions, accessing the data from another source or in some other way such as in aggregated form, or the like).

In another embodiment, replication manager 105 may determine that a restriction does not apply to a requested operation. For example, the requested operation may be to just view the data. Viewing the data may involve, for example, a temporary storage of the data in cache memory, which may not be restricted by a replication policy for the dataset. Accordingly, replication manager 105 determines that the requested operation is not restricted by policy and permits 416 an execution of the operation. The operation results 113 may then be presented to the requesting user.

In view of the explanations set forth above, readers will recognize that the benefits of restriction-compliant data replication according to embodiments of the present disclosure include:
  Reducing the amount of data that is replicated to different storage regions by restricting datasets in compliance with applicable data protection regulations.
  Enabling selective replication of portions of datasets.
  Enabling specific dataset operation restrictions such as persistent storage while still permitting other dataset operations such as temporary storage of the dataset in volatile memory Exemplary embodiments of the present disclosure are described largely in the context of a fully functional computer system for restriction-compliant data replication. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
  receiving a request to replicate a dataset of a database that is stored in a cloud-based data warehouse at a first region of a plurality of geographic regions to a second region of the plurality of geographic regions, wherein the second region is subject to persistent storage restrictions different from restrictions of the first region;
  selecting a replication policy, applicable to the second region, wherein the replication policy specifies replication restrictions that conform to the persistent storage restrictions of the second region, wherein the replication restrictions specify a format of storage in which the dataset is permitted to be stored at the second region, and wherein the format of storage is one of volatile storage and non-volatile storage; and
  replicating the dataset from the first region to the second region, including applying the replication restrictions of the replication policy to the dataset.

2. The method of claim 1, wherein applying the replication policy further comprises restricting a first type of operation on the dataset at the second region while permitting an execution of a second type of operation on the dataset at the second region.

3. The method of claim 2, wherein applying the replication policy further comprises restricting the first type of operation on a first portion of the dataset but not on a second portion of the dataset.

4. The method of claim 1, wherein applying the replication policy further comprises restricting the dataset from being stored in a non-volatile storage format at the second region while permitting the dataset to be stored in a volatile memory format at the second region.

5. The method of claim 1, wherein applying the replication policy further comprises:
restricting persistent storage of the dataset at the second region when the dataset is replicated from the first region;
generating metadata that identifies one or more operational restrictions associated with the dataset; and
storing the metadata with the dataset.

6. The method of claim 5, further comprising:
after applying the replication policy, receiving a request to perform an operation on the dataset; and
based on a determination that the replication policy restricts an execution of the operation:
preventing the execution of the operation; and
presenting the generated metadata in response to the request.

7. The method of claim 5, wherein the metadata identifies one or more computing devices in geographic regions where the replication policy is not applicable to the dataset.

8. The method of claim 1, wherein applying the replication policy includes encrypting the dataset.

9. The method of claim 1, further comprising applying the replication policy to the dataset before the dataset is replicated to the second region.

10. The method of claim 1, further comprising applying the replication policy to the dataset after the dataset is replicated to the second region.

11. An apparatus comprising a computing device, a computer processor, and a computer memory operatively coupled to the computer processor, the computer memory having disposed within it computer program instructions that, when executed by the computer processor, cause the apparatus to carry out the steps of:
receiving a request to replicate a dataset of a database that is stored in a cloud-based data warehouse at a first region of a plurality of geographic regions to a second region of the plurality of geographic regions, wherein the second region is subject to persistent storage restrictions different from restrictions of the first region;
selecting a replication policy, applicable to the second region, wherein the replication policy specifies replication restrictions that conform to the persistent storage restrictions of the second region, wherein the replication restrictions specify a format of storage in which the dataset is permitted to be stored at the second region, and wherein the format of storage is one of volatile storage and non-volatile storage; and
replicating the dataset from the first region to the second region, including applying the replication restrictions of the replication policy to the dataset.

12. The apparatus of claim 11, wherein applying the replication policy further comprises restricting a first type of operation on the dataset at the second region while permitting an execution of a second type of operation on the dataset.

13. The apparatus of claim 11, wherein applying the replication policy further comprises restricting a first type of operation on a first portion of the dataset but not on a second portion of the dataset.

14. The apparatus of claim 12, wherein the first type of operation includes storing the dataset in a non-volatile storage format at the second region.

15. The apparatus of claim 12, wherein the second type of operation includes storing the dataset in a volatile memory format.

16. A computer program product comprising a non-transitory computer readable storage medium and computer program instructions stored therein that are configured to, when executed by a processor, cause a computer to perform operations comprising:
receiving a request to replicate a dataset of a database that is stored in a cloud-based data warehouse at a first region of a plurality of geographic regions to a second region of the plurality of geographic regions, wherein the second region is subject to persistent storage restrictions different from restrictions of the first region;
selecting a replication policy, applicable to the second region, wherein the replication policy specifies replication restrictions that conform to the persistent storage restrictions of the second region, wherein the replication restrictions specify a format of storage in which the dataset is permitted to be stored at the second region, and wherein the format of storage is one of volatile storage and non-volatile storage; and
replicating the dataset from the first region to the second region, including applying the replication restrictions of the replication policy to the dataset.

17. The computer program product of claim 16, wherein applying the replication policy further comprises restricting a first type of operation on the dataset at the second region while permitting an execution of a second type of operation on the dataset.

18. The computer program product of claim 17, wherein applying the replication policy further comprises restricting the first type of operation on a first portion of the dataset but not on a second portion of the dataset.

19. The computer program product of claim 17, wherein the second type of operation includes storing the dataset in a volatile memory format.

* * * * *